United States Patent
Allicock et al.

(10) Patent No.: US 12,017,570 B2
(45) Date of Patent: Jun. 25, 2024

(54) BED MOUNTED WINCH AND RAMP

(71) Applicant: KUBOTA CORPORATION, Osaka (JP)

(72) Inventors: Nicholas Allicock, Atlanta, GA (US); Fahmid Sharkar, Atlanta, GA (US); Hiroki Bessho, Duluth, GA (US); Travis Wilson, Sugar Hill, GA (US)

(73) Assignee: KUBOTA CORPORATION, Osaka (JP)

( * ) Notice: Subject to any disclaimer, the term of this patent is extended or adjusted under 35 U.S.C. 154(b) by 114 days.

(21) Appl. No.: 17/131,942

(22) Filed: Dec. 23, 2020

(65) Prior Publication Data
US 2022/0194288 A1    Jun. 23, 2022

(51) Int. Cl.
*B60P 1/43*     (2006.01)
*B60P 1/04*     (2006.01)
*B62D 33/027*   (2006.01)
*B62D 33/037*   (2006.01)

(52) U.S. Cl.
CPC ............. *B60P 1/435* (2013.01); *B60P 1/04* (2013.01); *B62D 33/0273* (2013.01); *B62D 33/037* (2013.01)

(58) Field of Classification Search
CPC .. B60P 1/267; B60P 1/435; B60P 1/04; B60P 1/16; B60P 1/26; B62D 33/0273; B62D 33/03; B62D 33/037
USPC ............ 414/480, 538, 483–485, 537; 296/61
See application file for complete search history.

(56) References Cited

U.S. PATENT DOCUMENTS

| | | | | |
|---|---|---|---|---|
| 2,703,658 A | * | 3/1955 | Bazzell ................... | B60P 3/122 298/19 V |
| 3,712,491 A | * | 1/1973 | Kreutzer ............... | B60P 1/6454 414/500 |
| 3,726,423 A | * | 4/1973 | Miron ..................... | B60P 3/062 296/61 |
| 3,833,261 A | * | 9/1974 | Dingler .................... | B60P 1/16 298/1 A |
| 3,976,209 A | * | 8/1976 | Burton .................... | B60P 1/435 52/645 |
| 4,139,236 A | * | 2/1979 | Hill .......................... | B60P 1/30 293/134 |

(Continued)

FOREIGN PATENT DOCUMENTS

| | | | | |
|---|---|---|---|---|
| GB | 2425758 A | * 11/2006 | ............... | B60P 1/28 |
| WO | WO-2012042393 A2 | * 4/2012 | ............. | B60P 7/135 |

*Primary Examiner* — James Keenan
(74) *Attorney, Agent, or Firm* — Greenblum & Bernstein, P.L.C.

(57) ABSTRACT

A tailgate assembly is provided for a cargo bed having a bottom wall and a front, left and right side walls. An opening is defined between the left and right side walls, and the bottom wall. The tailgate assembly includes a first panel and a second panel. The first panel is pivotally connected to the bottom wall. The first panel is pivotable between a cargo-retaining position and an unfolded position with respect to the bottom wall. In the cargo-retaining position, the first panel closes the opening. The second panel is pivotally connected to the first panel. The second panel is pivotable between a folded position and a ramp position. In the folded position, the first panel and the second panel are substantially parallel to one another and in the ramp position the first and second panels extend from one another at an angle greater than ninety degrees.

20 Claims, 13 Drawing Sheets

(56) References Cited

U.S. PATENT DOCUMENTS

| | | | | |
|---|---|---|---|---|
| 4,735,454 A * | 4/1988 | Bernard | B60P 1/435 296/61 |
| 4,944,546 A * | 7/1990 | Keller | B60P 1/435 108/130 |
| 5,273,335 A * | 12/1993 | Belnap | B60P 1/435 296/61 |
| 5,312,148 A * | 5/1994 | Morgan | B60P 1/435 296/61 |
| 5,509,639 A * | 4/1996 | Ellis | B60P 3/12 254/323 |
| 5,544,944 A * | 8/1996 | Keech | B60P 1/24 298/5 |
| 5,857,724 A * | 1/1999 | Jarman | B62D 33/037 296/57.1 |
| 6,120,081 A * | 9/2000 | Collins | B60P 1/435 296/61 |
| 6,267,429 B1 * | 7/2001 | Kuzmich | B60P 1/435 296/57.1 |
| 6,378,927 B1 * | 4/2002 | Parry-Jones | B60P 1/435 296/61 |
| 6,561,746 B1 * | 5/2003 | Broussard | B60P 3/07 414/500 |
| 6,634,849 B2 * | 10/2003 | Clary | B60P 3/122 414/500 |
| 6,722,721 B2 * | 4/2004 | Sherrer | B60P 1/435 296/61 |
| 6,746,068 B1 * | 6/2004 | Hurd | B60P 1/435 296/57.1 |
| 7,032,977 B2 * | 4/2006 | Linares | B60P 1/16 298/17 SG |
| 7,708,299 B2 * | 5/2010 | Duval | B60P 1/435 280/789 |
| 7,735,894 B2 | 6/2010 | King et al. | |
| 8,172,310 B2 * | 5/2012 | Gagnon | B60P 1/26 296/183.1 |
| 8,322,964 B2 | 12/2012 | O'Brien | |
| 8,746,804 B2 * | 6/2014 | Kraenzle | B60P 1/30 298/12 |
| 9,016,990 B2 | 4/2015 | Grone | |
| 10,703,421 B2 * | 7/2020 | Marable | B60P 1/435 |
| 2002/0164239 A1 * | 11/2002 | Angermeier | B60P 3/122 414/480 |
| 2009/0123260 A1 | 5/2009 | Howard-Leicester | |

* cited by examiner

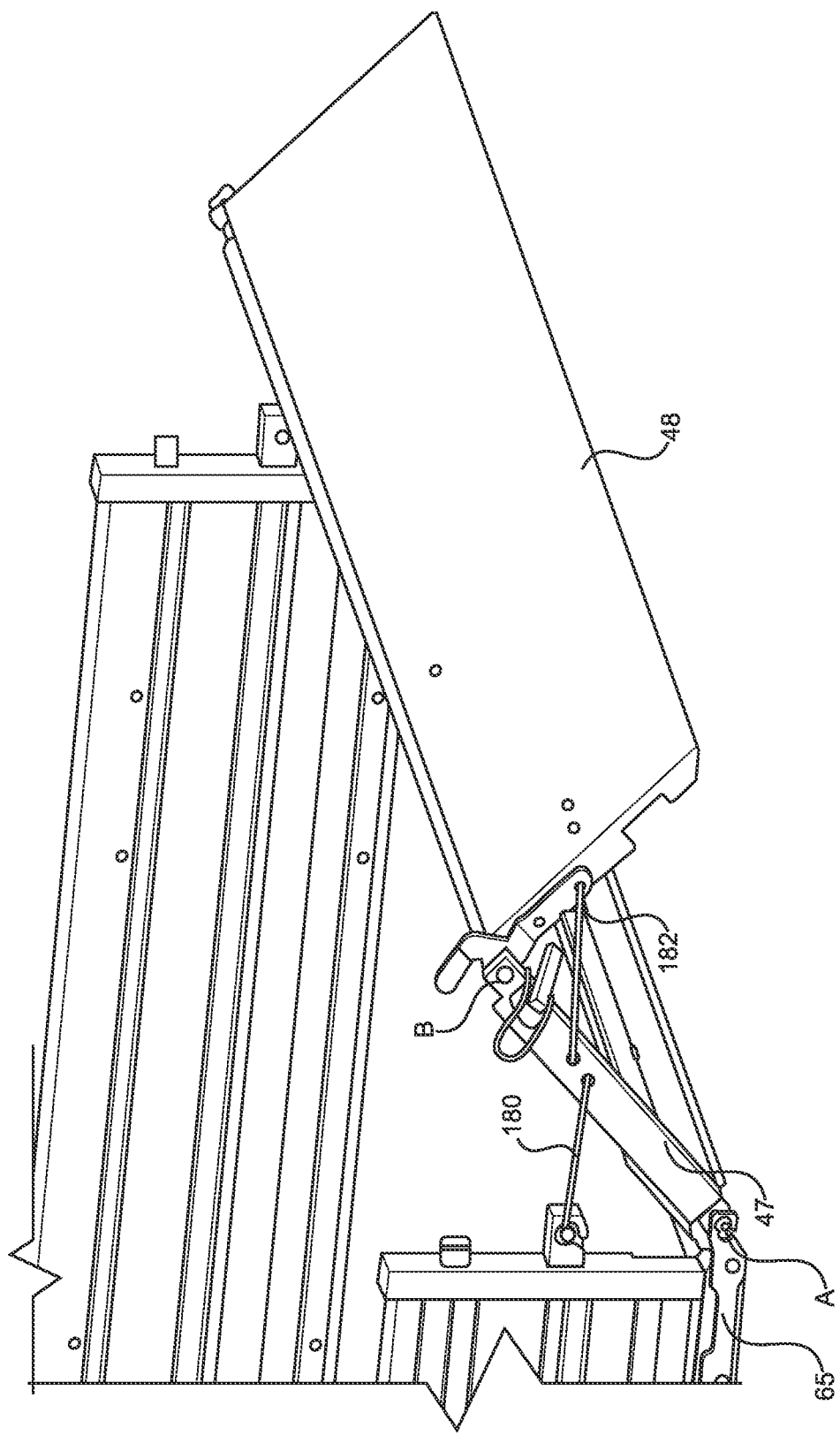

BED MOUNTED WINCH AND RAMP

BACKGROUND

1. Field

The present disclosure relates to cargo beds of utility terrain vehicles, and more specifically to winches and ramps for cargo beds of utility terrain vehicles.

2. Description of Related Art

A utility terrain vehicle (UTV), or side-by-side vehicle (SSV), also called a utility task vehicle is a small, 2- to 6-person four-wheel drive off-road vehicle. UTV's have powertrains similar to those of all-terrain vehicles (ATVs). Some UTVs have a dumping rear cargo bed, which provides room for a much larger load than most ATVs can haul, without attaching a trailer. As shown in FIGS. 1A and 1B, some UTV's can also be outfitted with a motorized winch 1 located outside of a cargo bed 2 to raise and lower cargo into the cargo bed 2. For example, some winches are mounted to a panel behind a cab 3 of the vehicle, above raised side walls 4, 5, and 6 of the cargo bed 2, as shown in FIG. 1A. Also, as shown in FIG. 1B, some winches 1 are mounted to a raised front wall 5 of the cargo bed 2 or a rigid bar at or above a top edge of the front wall 5.

As shown in FIG. 2, a UTV is shown with a pivotable or dumping cargo bed 2. The cargo bed 2 includes a foldable tailgate 6 at a rear end of the cargo bed 2. FIG. 2 shows the cargo bed 2 in a raised (tilted) position with the tailgate 6 folded down. When the cargo bed 2 is raised, a rear edge 7 of the tailgate 6 is located a distance (there is a gap G) above the ground plane of the wheels.

SUMMARY

One aspect of the present disclosure to reduce the aforementioned gap G to facilitate loading cargo from the ground into a cargo bed of a vehicle is a tailgate assembly that can be reconfigured into a loading ramp. In accordance with various embodiments, the tailgate can deploy in various ways to extend from the cargo bed downward toward the ground forming an inclined ramp to facilitate moving cargo into and out of the cargo bed. In embodiments, the tailgate assembly is for a cargo bed extending from a forward end to a rearward end. The cargo bed has a left side wall extending at least partially from the forward end to the rearward end, a right side wall extending at least partially from the forward end to the rearward end, and a bottom wall extending at least partially from the forward end to the rearward end, and further extending at least partially between the left side wall and the right side wall and defining an opening at the rear end between the left and right side walls and the bottom wall. The tailgate assembly includes a first panel and a second panel. The first panel is pivotally connected to the bottom wall and is pivotable between a cargo-retaining position and an unfolded position with respect to the bottom wall. In the cargo-retaining position, the first panel closes the opening at the rear end of the cargo bed. The second panel is pivotally connected to the first panel. The second panel is pivotable between a folded position and a ramp position. In the folded position the first panel and the second panel are substantially parallel to one another and in the ramp position the first and second panels extend from one another at an angle greater than ninety degrees. In embodiments, the first panel extends from a first end to a second end, and the second panel extends from a first end to a second end, and the second end of the first panel is hingedly attached to the first end of the second panel such that the second panel is movable between the folded position and the ramp position. In embodiments, the first panel and the second panel are hingedly attached with a plurality of hinges spaced along lengths of the first and second panels.

In embodiments, the first panel defines an end wall for the cargo bed when the first panel is in the cargo-retaining position. In embodiments, the second panel nests into the first panel when the first panel is in the cargo-retaining position and the second panel is in the folded position. Also, in embodiments, the tailgate assembly further includes a locking member configured to selectively retain the first panel in the cargo-retaining position.

In embodiments, the tailgate assembly further includes a limiting member coupled to the first or second panels configured to limit an angular displacement of the second panel between the folded position and the ramp position to a predefined maximum angle, which may be, for example, 180 degrees. Also, in embodiments, the tailgate assembly further includes a limiting member coupled to the first panel and configured to limit an angular displacement of the first panel between the cargo-retaining position and the unfolded position to a predefined maximum angle, which may be 180 degrees.

In embodiments, the first panel has an upper flat side facing at least partly upward in the unfolded position and the second panel has an upper flat side facing at least partly upward in the ramp position, and wherein the flat upper sides of the first and second panels face in opposite directions when the first panel is in the cargo retaining position and the second panel is in the folded position. In embodiments, the flat upper sides of the first and second panels face one another when the first panel is in the cargo retaining position and the second panel is in the folded position.

Another aspect of the present disclosure is a vehicle having a cargo bed incorporating a tailgate assembly described herein in accordance with the present disclosure.

Another aspect to facilitate loading cargo from the ground onto the cargo bed is a winch assembly that is configured to fix a winch to a cargo bed. The winch assembly includes a winch having a motor and a housing for a spool configured to be driven by the motor to wind and unwind cable from the spool. Also, the winch assembly includes a mount extending from the winch and having a base configured for fixed connection to the bottom wall, or the front side wall, or the bottom and front side walls of the cargo bed. Thus, the mount provides a strong, reinforced connection of the winch to the cargo bed.

In embodiments, the winch assembly further includes a wiring harness connected to the winch and configured to extend through a hole defined in the bottom wall of the cargo bed and extend along an underside of the bottom wall of the cargo bed. In embodiments, a height of the winch assembly is less than a height of any of the front side wall, left side wall, and right side wall of the cargo bed.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings, and wherein:

Prior Art

Prior Art

FIG. 18 shows an alternate embodiment of the tailgate assembly shown in FIG. 10.

DETAILED DESCRIPTION OF THE DISCLOSURE

The particulars shown herein are by way of example and for purposes of illustrative discussion of exemplary embodiments of aspects of the present disclosure only and are presented in the cause of providing what is believed to be the most useful and readily understood description of the principles and conceptual aspects of the present disclosure. In this regard, no attempt is made to show structural details in more detail than is necessary for the fundamental understanding of the aspects of the present disclosure, the description taken with the drawings making apparent to those skilled in the art how the forms of the aspects of the present disclosure may be embodied in practice.

Hereafter, embodiments of the present disclosure are described with reference to the drawings. In this detailed description, unless indicated otherwise, a word "front" means the front (forward) side with respect to a vehicle body front/rear direction (traveling direction). A word "rear" means the rear (rearward or reverse) side with respect to the vehicle body front/rear direction (traveling direction). Further, a language "left/right direction" or "lateral direction" means a vehicle body transverse direction (vehicle body width direction) perpendicular to the vehicle body front/rear direction. Also, a word "upper" and a word "lower" respectively refer to positional relationship in the perpendicular direction (vertical direction) of the vehicle body, indicating relationship in terms of ground clearance height.

Figure 3A:
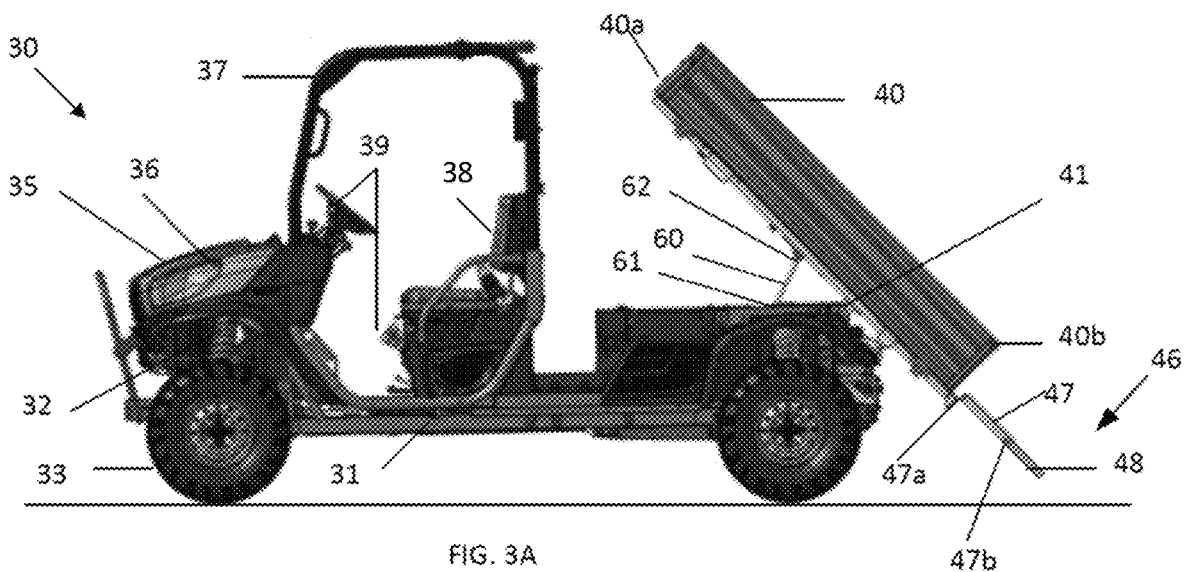
FIG. 3A is a left side view of a UTV with a bed configured in accordance with an aspect of the disclosure shown in a raised position with tailgate ramp extended.
Figure 3B:
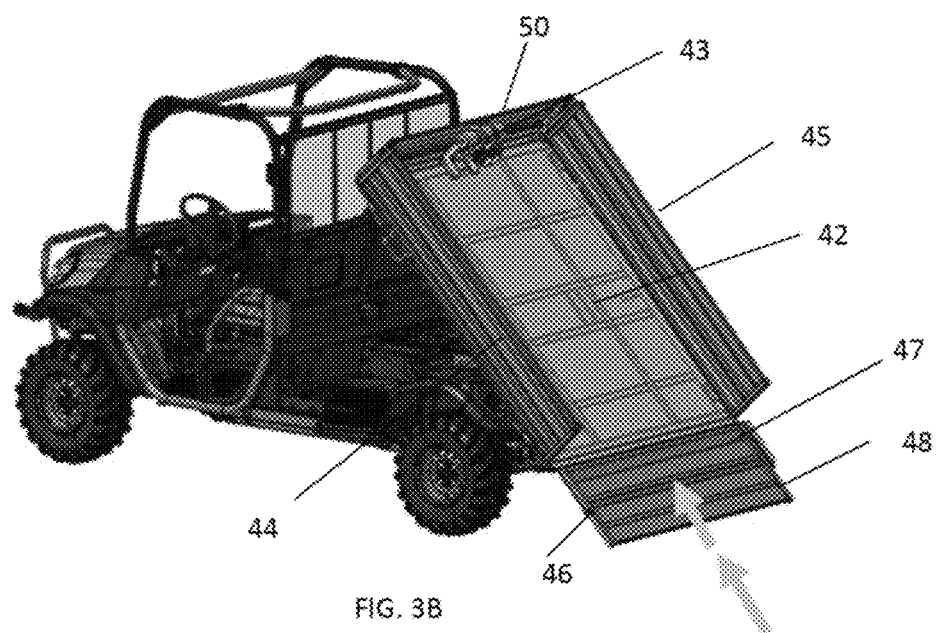
FIG. 3B is a left, rear, and top perspective view of the UTV shown in FIG. 3A and shown with a schematic load with arrows showing a direction of cargo loading.
Figure 4:
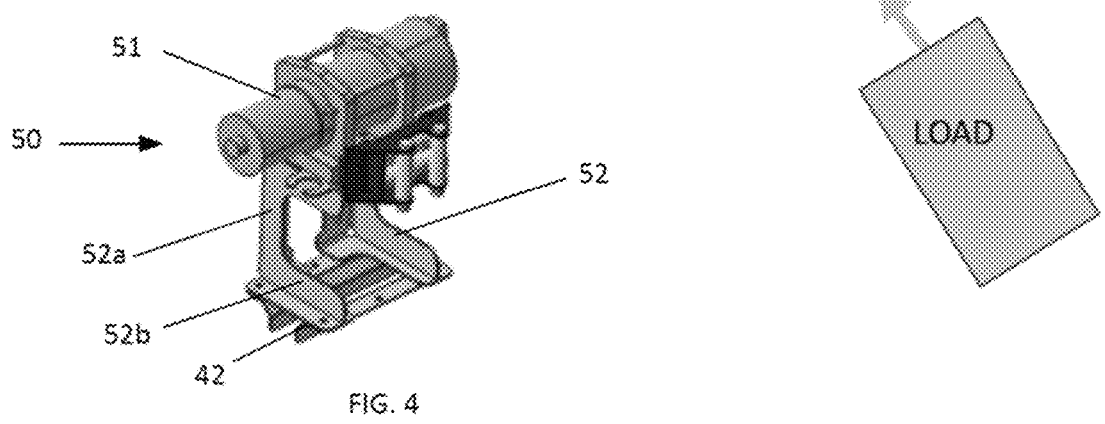
FIG. 4 shows an enlarged view of an exemplary bed-mounted winch assembly shown in FIG. 3B, in accordance with an aspect of the disclosure.

FIGS. 3A and 3B show an example of work vehicle 30 configured in accordance with the present disclosure. Specifically, by way of an exemplary embodiment of a work vehicle, a UTV 30 is shown in FIGS. 3 and 4. The UTV 30 includes a vehicle body frame 31, a suspension 32 (e.g., springs, gas struts, etc.) supporting the frame, and four wheels 33 movably supporting the suspension and the frame. The UTV 30 is powered by a motor 35, which may be of any type, such as internal combustion engine, battery, fuel cell, etc. In the example embodiment, the motor 35 is located under a hood 36 at the front end of the UTV 30. The UTV 30 has a cab 37 located behind or rearward the motor 36. The cab 37 houses driver and passenger seats 38 and all of the controls 39 for operating the UTV, such as steering wheel, transmission gear selector, headlights switches, brake pedal, etc., which are known in the art. The cab 37 is generally formed as an open cage.

Behind or rearward of the cab 37, the UTV 30 includes a cargo bed 40, which is pivotally attached to the frame 31 at a hinge 41 to permit the cargo bed 40 to be pivoted (raised) (as shown in FIGS. 3A and 3B) and lowered as a dump bed. As used herein, "raised" and "lowered" refers to the vertical position of the front end 40a of the cargo bed 40 relative to the frame 31.

As shown in greater detail in FIG. 3B, the cargo bed 40 is arranged generally as an open top box having a bottom wall 42, a front side wall 43, a right side wall 44, and a left side wall 45. The cargo bed also includes a tailgate assembly 46 that selectively closes an opening defined between the right and left side walls 44, 45, and the bottom wall 42. The bottom wall 42, the right side wall 44, and the left side wall 45 extend from the front end 40a to the rear end 40b of the cargo bed 40. The tailgate assembly 46 is pivotally attached to the bottom wall 42, as discussed in greater detail hereinbelow. In the exemplary embodiment, the three side walls 43, 44, and 45 of the cargo bed 40 are fixed to the base and/or to one another at adjoining corners of the cargo bed 40.

As shown in FIG. 3A, the tailgate assembly 46 includes a first panel 47 and a second panel 48 that are pivotally attached to one another. The first panel 47 is pivotally attached at a first end 47a to the bottom wall 42 of the cargo bed 40 and is pivotally attached at a second end 47b to the second panel 48. As shown in FIG. 3B, the first and second panels can be configured into a loading ramp that extends substantially towards the ground. Thus, the second panel 48 extends the reach of the first panel 47 towards the ground, which can facilitate moving cargo into and out of the cargo bed 40.

As noted above, the cargo bed 40 is pivotally connected to the frame 31 at a hinge 41 connecting the underside of bottom wall 42 and the frame 31. The bottom wall 42, and thus the entire cargo bed 40, is configured to rotate about hinge 41 about 45 to 60 degrees with respect to the frame 31. The UTV includes a hydraulic cylinder 60 that is pivotally connected at one end 61 thereof to the frame 31 and at another end 62 to the underside of the bottom wall 42 of the cargo bed 40. The hydraulic cylinder 60 is configured to extend and retract to respectively raise and lower the cargo bed 40. The hydraulic cylinder 60 may be operated via controls (e.g., 39) located inside or outside the cab 37, such as under or alongside the cargo bed 40.

In addition, the cargo bed 40 shown in FIG. 3B includes a winch assembly 50 that is fixed or otherwise mounted to the bottom wall 42 and/or the front side wall 43 of the cargo bed 40 near the front end 40a of the cargo bed 40. The winch assembly 50 may be mounted as far forward as possible in the cargo bed 42 to conserve space in the cargo bed 40. The winch assembly 50 includes a motorized winch 51 mounted or otherwise connected to a mount or frame 52 that is configured to connect securely to the cargo bed 40. The frame 52 is formed as a generally L-shaped bracket having an upright or vertical portion 52a and a lateral portion 52b extending from the upright portion 52a. The upright portion has a mounting flange configured to mount to the front side wall 43 of the cargo bed 40. The lateral portion 52b has a mounting flange that is configured to mount to the bottom wall 42 of the cargo bed 40. The connection of the frame 52 to the cargo bed 40 can be made, for example, using various types of fasteners, such as threaded fasteners. As shown in the side profile view in FIG. 3A, when the winch 51 is mounted in the cargo bed 40, it does not protrude above the upper edges of the side walls 43, 44, 45 or the panels 47 and 48 of the cargo bed 40.

Figure 5A:
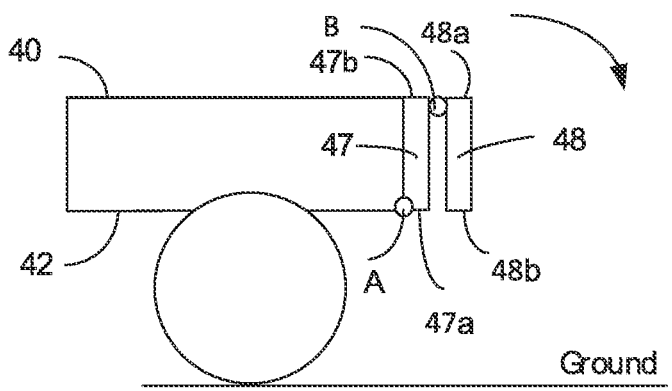
FIG. 5A is a schematic of the embodiment of the cargo bed and tailgate assembly shown in FIGS. 3A and 3B.
Figure 5B:
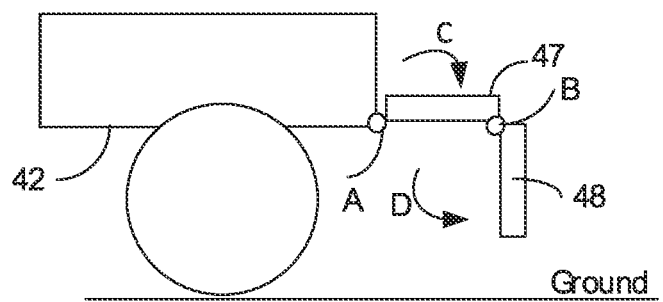
FIG. 5B shows the tailgate assembly of FIG. 5A with the first panel unfolded and the second panel folded.
Figure 5C:
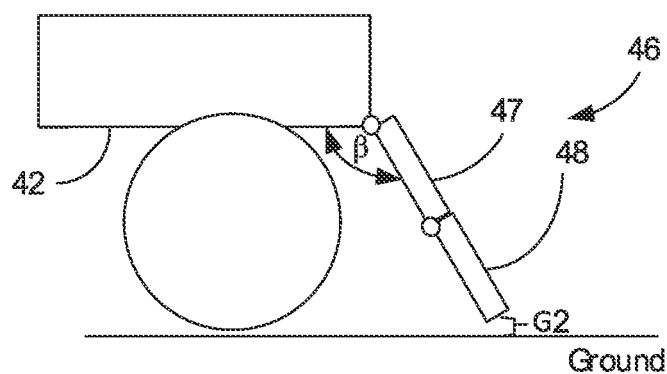
FIG. 5C shows the tailgate assembly of FIG. 5B with the first panel unfolded and the second panel unfolded in a ramp position.
Figure 5D:
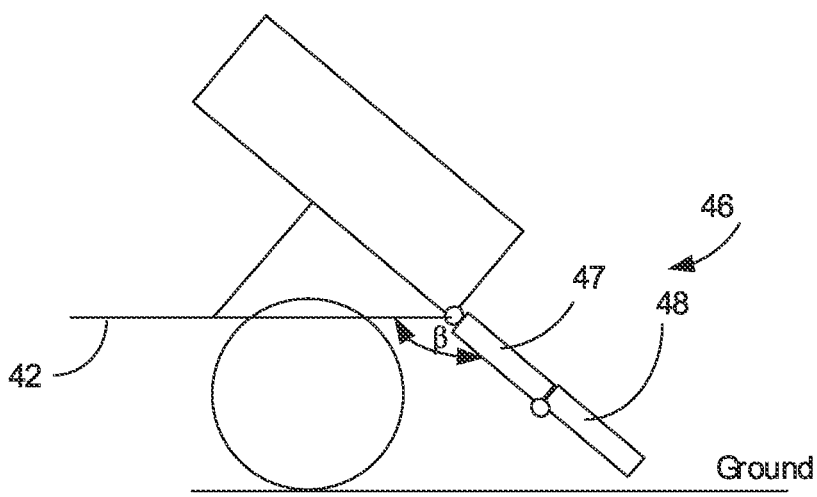
FIG. 5D shows the tailgate assembly of FIG. 5C with the cargo bed raised.

FIGS. 5A-5D schematically show the operation of the tailgate assembly 46 shown in FIGS. 3A and 3B. As shown in FIG. 5A, the tailgate assembly 46 is shown pivotally attached to the bottom wall of the cargo bed 40. The first panel 47 has a first end 47a that is pivotally connected to the bottom wall 42 of the cargo bed 40. The first panel 47 also has a second end 47b that is pivotally connected to a first end 48a of the second panel 48. In FIG. 5A, the tailgate assembly 46, and more specifically first panel 47, substantially closes the rear end of the cargo bed 40 and, thus, the first panel 47 is shown in a cargo-containing position. Also, in FIG. 5A, the second panel 48 extends parallel with the first panel 47 and is in a folded position. FIG. 5B shows the tailgate assembly 46 in an intermediate configuration where the first panel 47 is rotated about an axis A and the second panel 48 is rotated about axis B through the pivotal connections. Owing to the center of mass of the second panel 48, the second panel 48 remains substantially vertically oriented as the first panel 47 rotates in the direction of arrow C. To fully configure the tailgate assembly 46 into a ramp, the second panel 48 can be rotated about axis B in the direction of arrow D while the first panel 47 is allowed to rotate further in the direction of arrow C. The result of this operation will be to extend the tailgate panels 47 and 48 into the ramp configuration shown in FIG. 5C. It will be appreciated that raising the cargo bed 40 from the lowered position can increase the angle β between the tailgate panels 47 and 48 and the bottom wall 42 of the cargo bed 40, as shown in FIG. 5D.

Figure 1A:
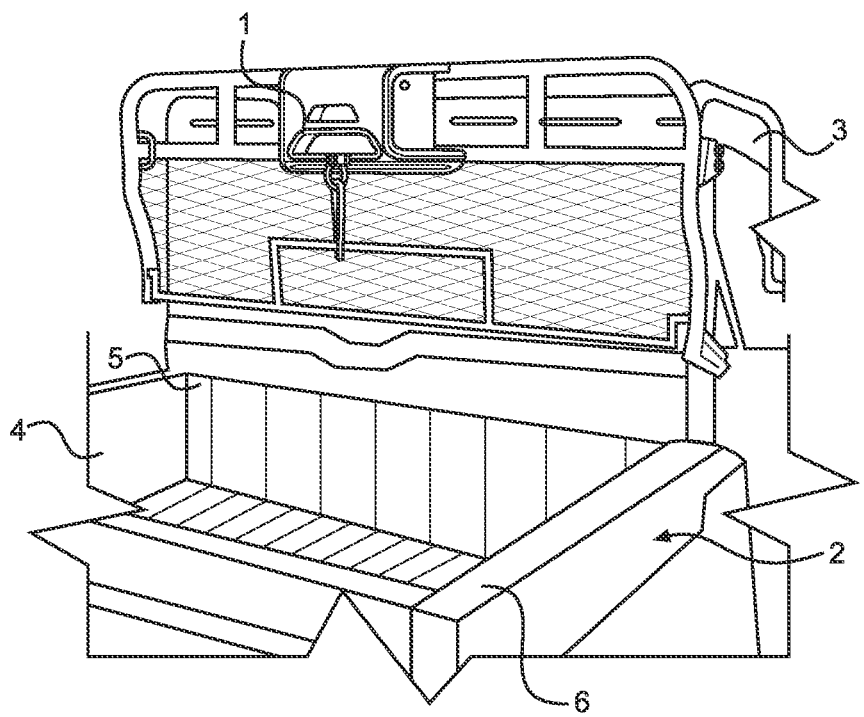
FIGS. 1A and 1B show two types of winch mounting locations on vehicles.
Figure 1B:
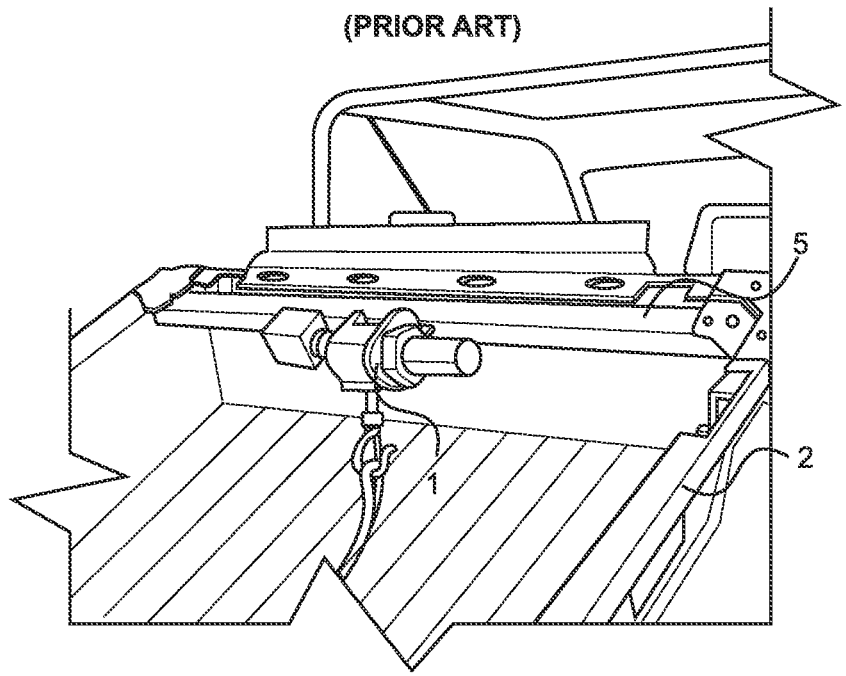
Figure 2:
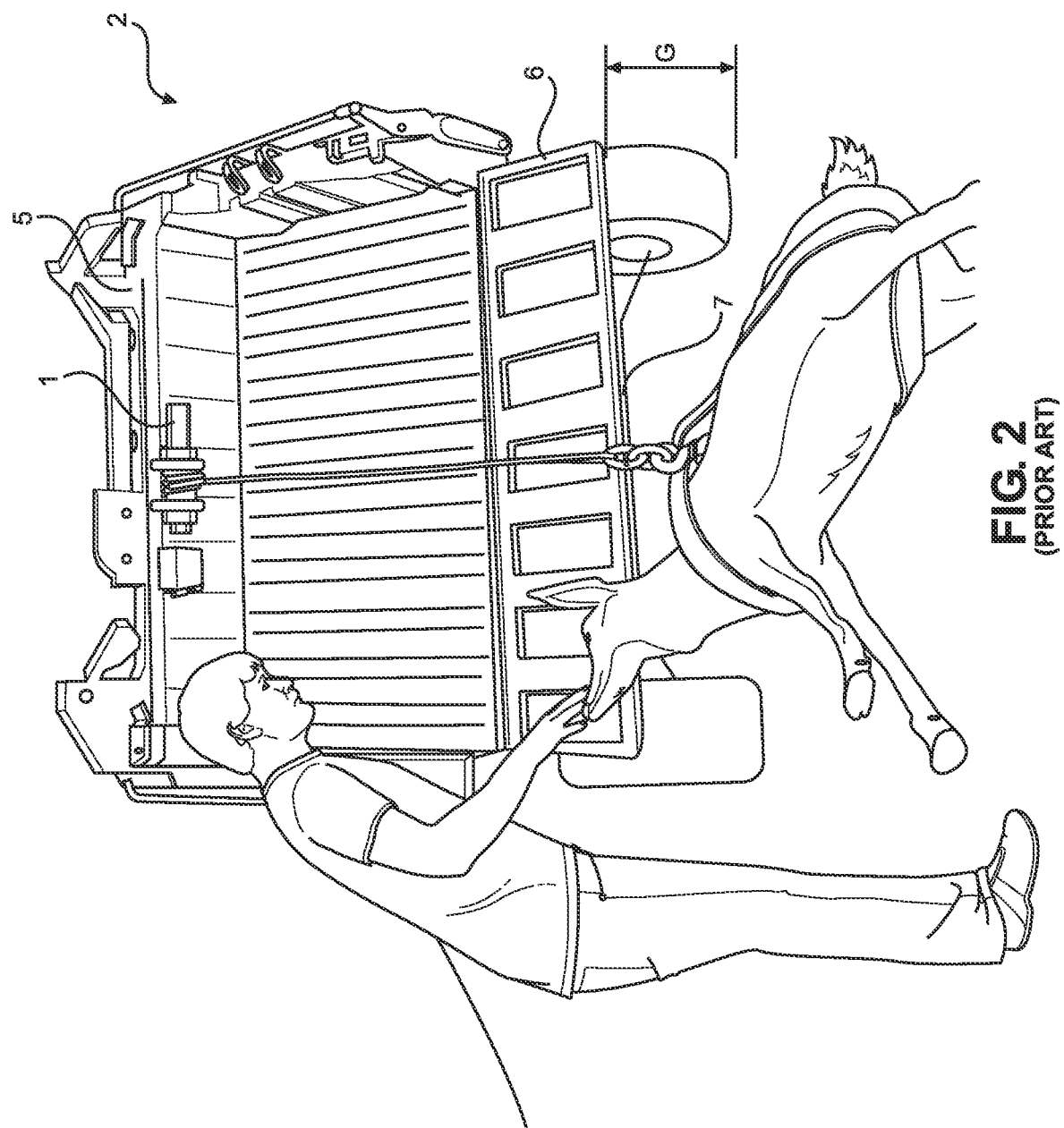
FIG. 2 shows a raised cargo bed of a UTV with cargo connected to a winch and assisted by an operator of the winch.

The ramp formed by the first and second panels 47 and 48 facilitates loading cargo into the cargo bed 40, especially when using the winch assembly 50, since the vertical distance G2 (FIG. 5C) between the second end 48b of the second panel 48 and the ground plane of the wheels is less than the gap G (FIG. 2).

Figure 6:
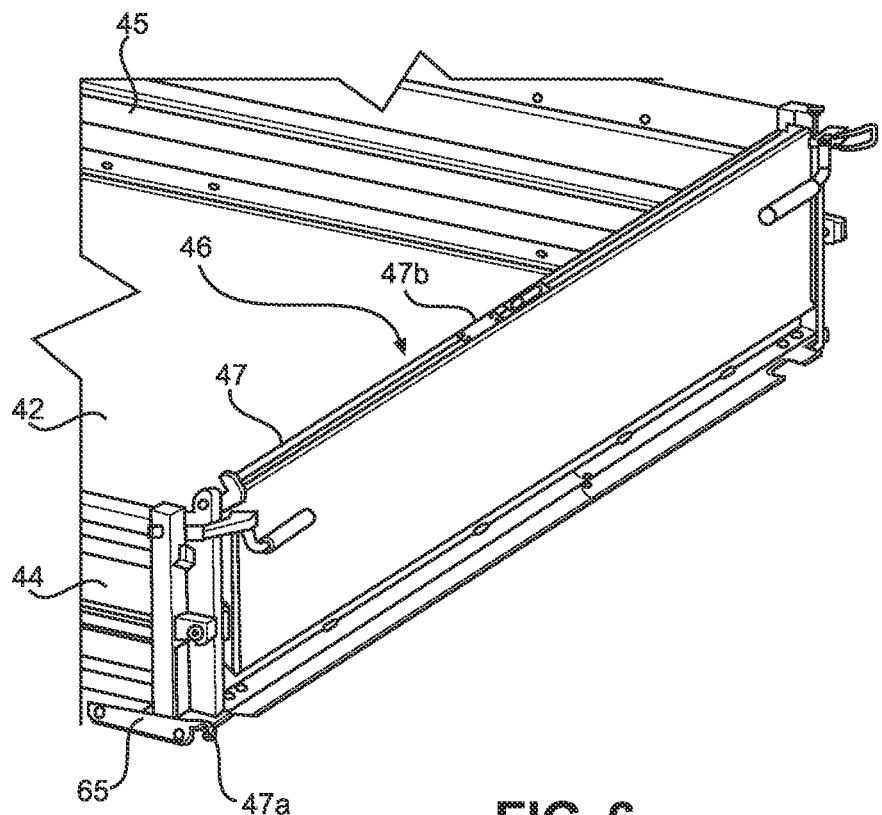
FIG. 6 shows a detailed view of the tailgate assembly of the UTV in a folded and stowed and cargo-containing configuration with a first and second panels of tailgate assembly contacting one another.

Further details of the construction of the exemplary embodiment of the tailgate assembly 46 will now be provided with reference to FIGS. 6-11. FIG. 6 shows the tailgate assembly 46 in a fully folded, upright, and stowed configuration (cargo-containing configuration) in which the first and second panels 47 and 48 are folded and extend parallel to one another. Thus, the configuration of the tailgate assembly 46 in FIG. 6 corresponds to that shown in FIG. 5A. In FIG. 6, the right side of the tailgate assembly 46 is visible, but the left side is not visible. However, the left and right sides of the tailgate assembly are mirror images of one another.

The surfaces of the tailgate panels 47 and 48 shown and visible in the configuration shown in FIG. 6 form the upper surfaces of the ramp when the tailgate assembly is unfolded and deployed in the ramp configuration shown in FIGS. 5C and 5D. The upper surfaces of the first and second panels 47 and 48 are substantially planar to facilitate sliding of cargo along the surfaces into and out of the cargo bed 40. Moreover, in the configuration shown in FIG. 6, the upper surfaces of the first and second panels 47 and 48 face opposite directions, namely forward and rearward.

In the embodiment shown, the heights of the side walls 43, 44, and 45 of the cargo bed 40 are substantially equal to one another and also to the width W of the first panel 47 so that the second end 47b of the first panel 47 is approximately flush with upper edges of the side walls 43, 44, and 45 of the cargo bed 40.

Figure 7:
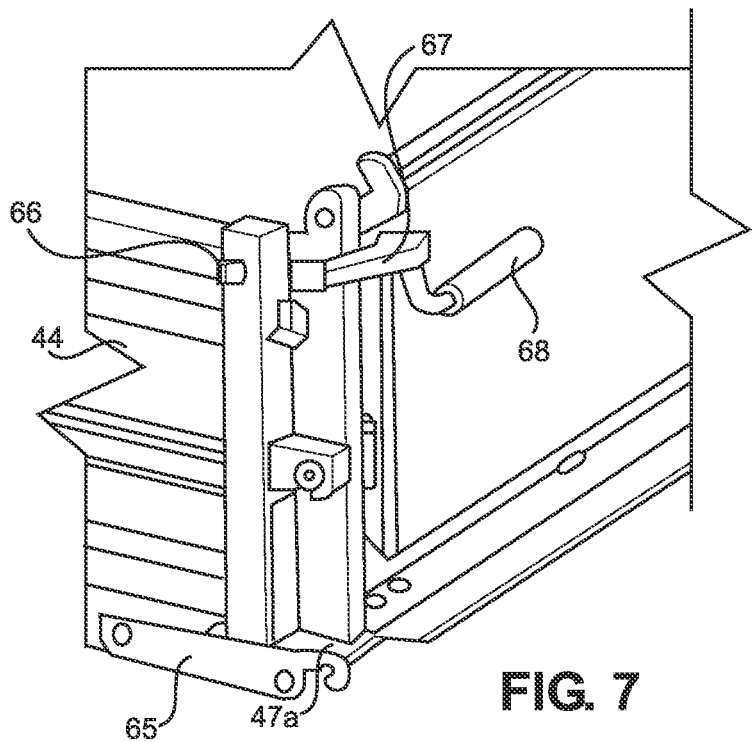
FIG. 7 is an enlarged view of the rear left corner of the cargo bed shown in FIG. 6.

As shown in greater detail in FIG. 7, the first end 47a of the first panel 47 is pivotally connected to a bracket 65, which is fixed to a left side of the bottom wall 42 of the cargo bed 40. The left side wall 44 includes a hook 66 that is configured to engage a loop of a latch 67 to selectively lock and unlock the tailgate assembly 46 in its fully folded and stowed configuration. The latch 67 includes a handle 68 that is configured to pivot about a vertical axis away (to the left) from the tailgate assembly 46 to unlock the tailgate assembly and to pivot towards the tailgate assembly to lock the tailgate in its fully folded and stowed configuration. As shown in FIG. 6, the handles 68 are in the locked position.

Figure 8:
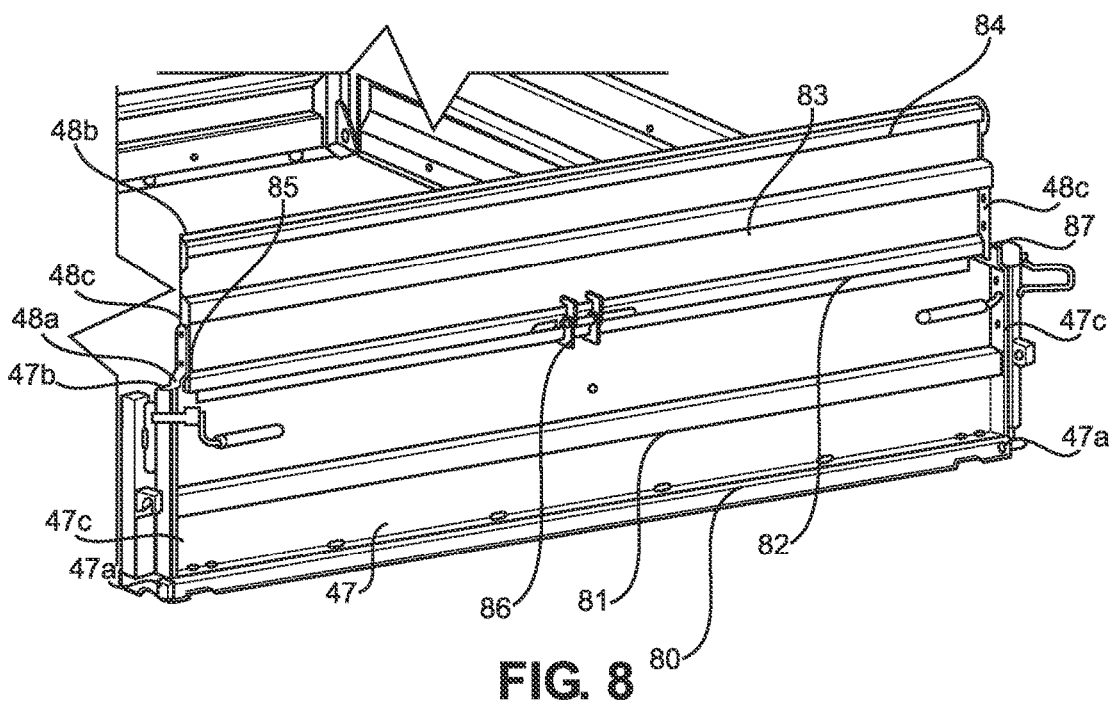
FIG. 8 shows the tailgate assembly of FIG. 6 with the second panel of the tailgate assembly of FIG. 6 pivoted upward and away from the first panel of the tailgate assembly.
Figure 9:
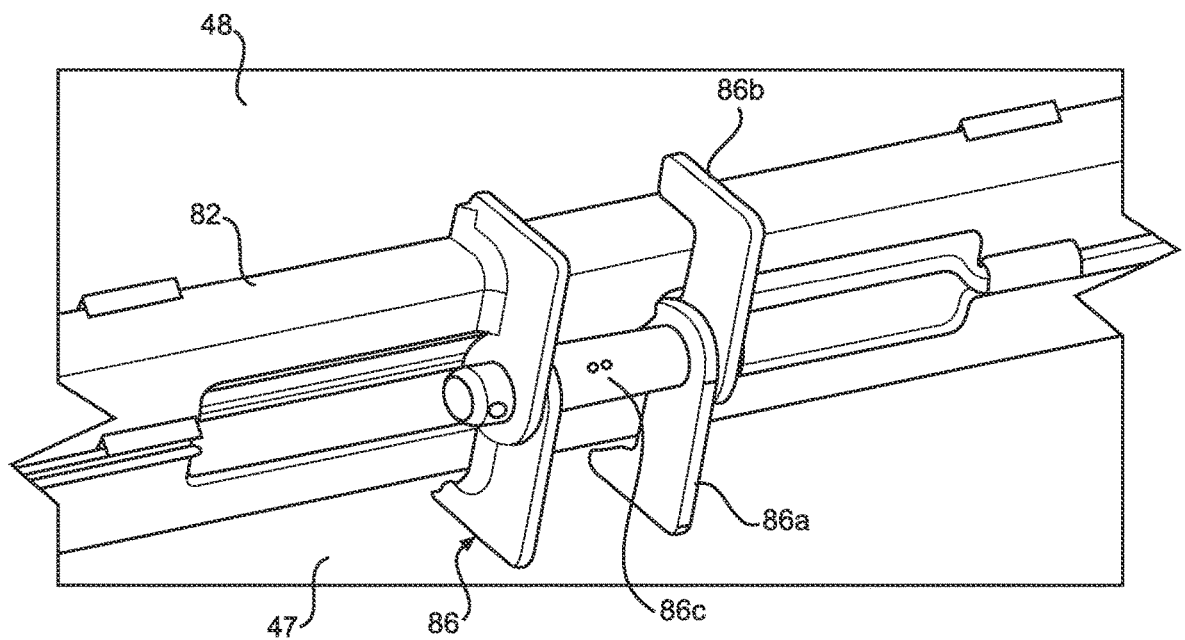
FIG. 9 shows a detailed view of a bracket hinge between the first and second panels of the tailgate assembly shown in FIGS. 6 and 8.

FIGS. 8 and 9 show the second panel 48 rotated upward and away from the first panel 47 about 180 degrees from the folded position shown in FIGS. 6 and 7, thereby exposing undersides of the first and second panels. The first panel 47 includes side flanges 47c extending from an upper surface of the first panel 47. Also, the second panel 48 includes side flanges 48c extending from an upper surface of the second panel. The flanges 47c extend generally from the first end 47a to the second end 47b. The flanges 48c extend generally from the first end 48a to the second end 48b. The lower surface of the first panel 47 is generally planar with the exception of reinforcement channels or corrugations 80, 81, and 82 that extend horizontally along the length of the first panel 47 from one side flange 47c to the opposite side flange 47c. Similarly, the lower surface of the second panel 48 is generally planar with the exception of reinforcement channels or corrugations 82, 83, and 84 that extend horizontally along the length of the second panel 48 from one side flange 48c to the opposite side flange 48c. Reinforcement channel 82 straddles the joint between the first panel 47 and the second panel 48 such that approximately one half of the channel 82 extends along the first panel 47 and another half of the channel 82 extends along the second panel 48. The reinforcement channels 80-84 stiffen the panels 47 and 48 to limit deflection or bending in the vertical direction especially when loads are placed on the panels when they are deployed in a ramp configuration shown in FIGS. 5C and 5D.

As shown in FIG. 8, the first and second panels 47 and 48 are pivotally connected with a plurality of discrete hinges 85, 86, and 87. In the exemplary embodiment, hinges 85 and 87 are located at the lateral sides of the panels 47 and 48, while hinge 86 is located at a central location between the side flanges 48c and 47c. The hinge 85 is formed by a connection of the flanges 48c and 47c with a hinge pin. The hinge 87 is formed by a connection of the flanges 48c and 47c on the left side.

As shown in greater detail in FIG. 9, the central hinge 86 includes one bracket 86a that is fixed to the portion of channel 82 on the first panel 47 and one bracket 86b that is fixed to the portion of channel 82 on the second panel 48. The brackets 86a and 86b define hinge pin holes that align and are connected together with a hinge pin 86c. Without being bound by theory, the central hinge 86 significantly stiffens the tailgate assembly 46 when the first and second panels 47 and 48 are unfolded into a ramp configuration shown in FIGS. 5C and 5D.

Figure 10:
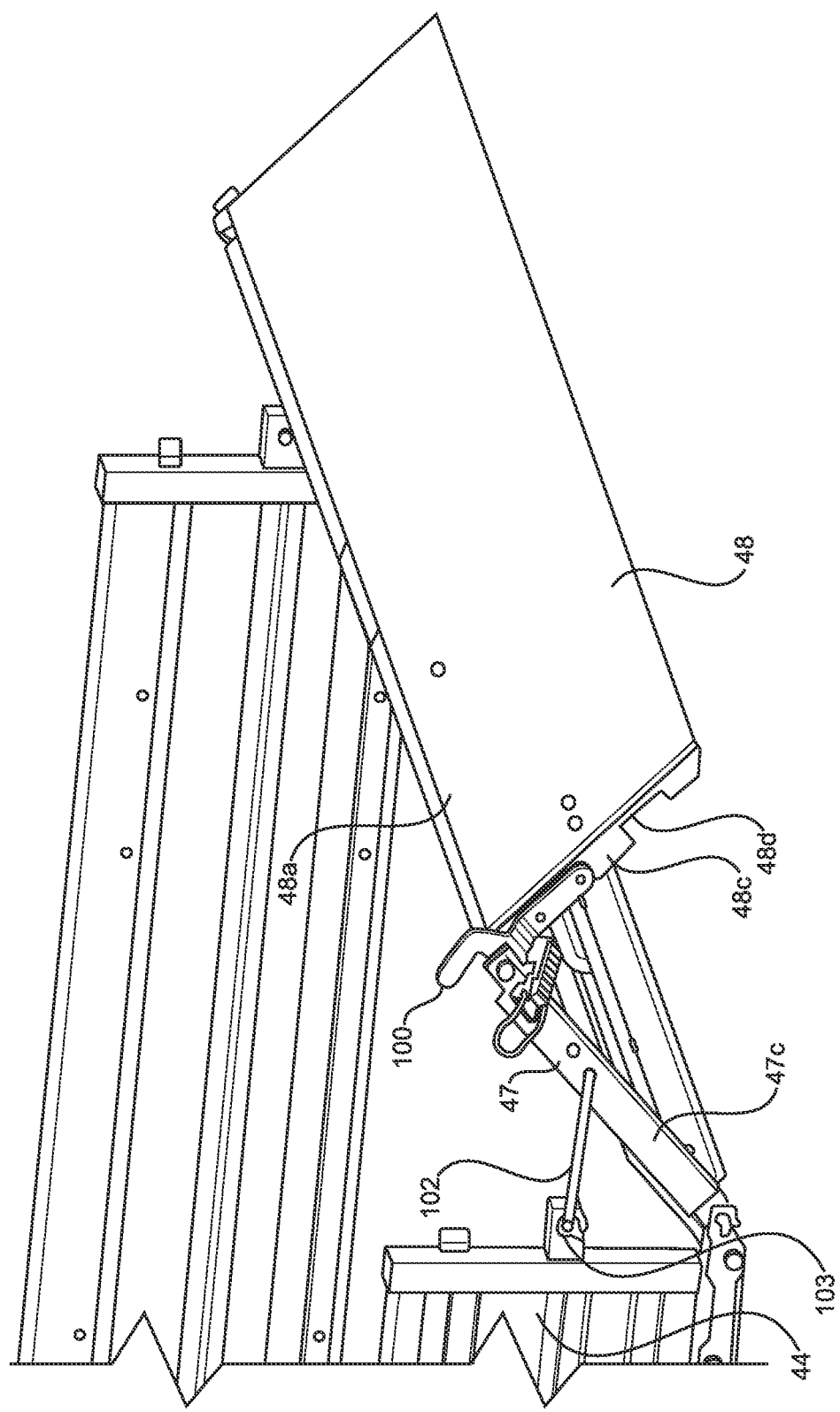
FIG. 10 shows the tailgate assembly in an intermediate extended configuration.

As shown in greater detail in FIG. 10, the side flanges 48c of the second panel 48 define notches 48d that receive a corresponding reinforcement channel 81 of the first panel 47. This arrangement permits the second panel 48 to nest within and between the flanges 47c of the first panel 47 when the second panel 48 is in the folded position shown in FIG. 6. In order for the second panel 48 to nest into the first panel 47, the length of the second panel 48, measured between flanges 48c, is slightly less than the length of the first panel 47 measured between flanges 47c.

FIG. 10 shows the tailgate with the latches 67 unlocked and the first and second panels 47 and 48 partially unfolded. The range of rotation and extension of the first and second panels 47 and 48 can be controlled or otherwise limited as discussed below. For example, FIG. 10 illustrates a stop bar 100 that is fixed to the side flange 48c of the second panel 48. The stop bar 100 extends beyond the first end 48a of the second panel 48. The stop bar 100 is configured to limit the angular rotation of the second panel 48 with respect to the first panel 47. In the embodiment, the stop bar 100 rotates with the second panel 48 until it contacts the upper surface of the first panel 47, which will occur when second panel rotates about 180 degrees from the first panel 47. Once the stop bar contacts the first panel 47, the angle between the first and second panels 47 and 48 cannot increase.

Also, in the embodiment shown in FIG. 10, a cable or brace 102 is connected from a point on flange 47c of the first panel 47 to an attachment point 103 at the rear end of the left side wall 44 of the cargo bed 40. The attachment point 103 may be configured as a cable retractor that is configured to dispense or pay out cable 102 as the first panel 47 is rotated downwardly and to wind up the cable 102 when the first panel 47 is rotated upwardly. In one embodiment, the length of the cable 102 or brace is of fixed length such that the range of rotation of the first panel with respect to its cargo-containing position is limited to a certain angular range, such as, for example, 90 or 180 degrees. In some circumstances, such as where the ground level behind the rear end 40b of the cargo bed 40 drops off below the ground plane of the wheels, it may be useful to configure the cable 102 to be selectively detachable at one or both of its ends to allow the first panel 47 to rotate further than permitted by the cable 102 when it is attached at both ends.

Figure 11:
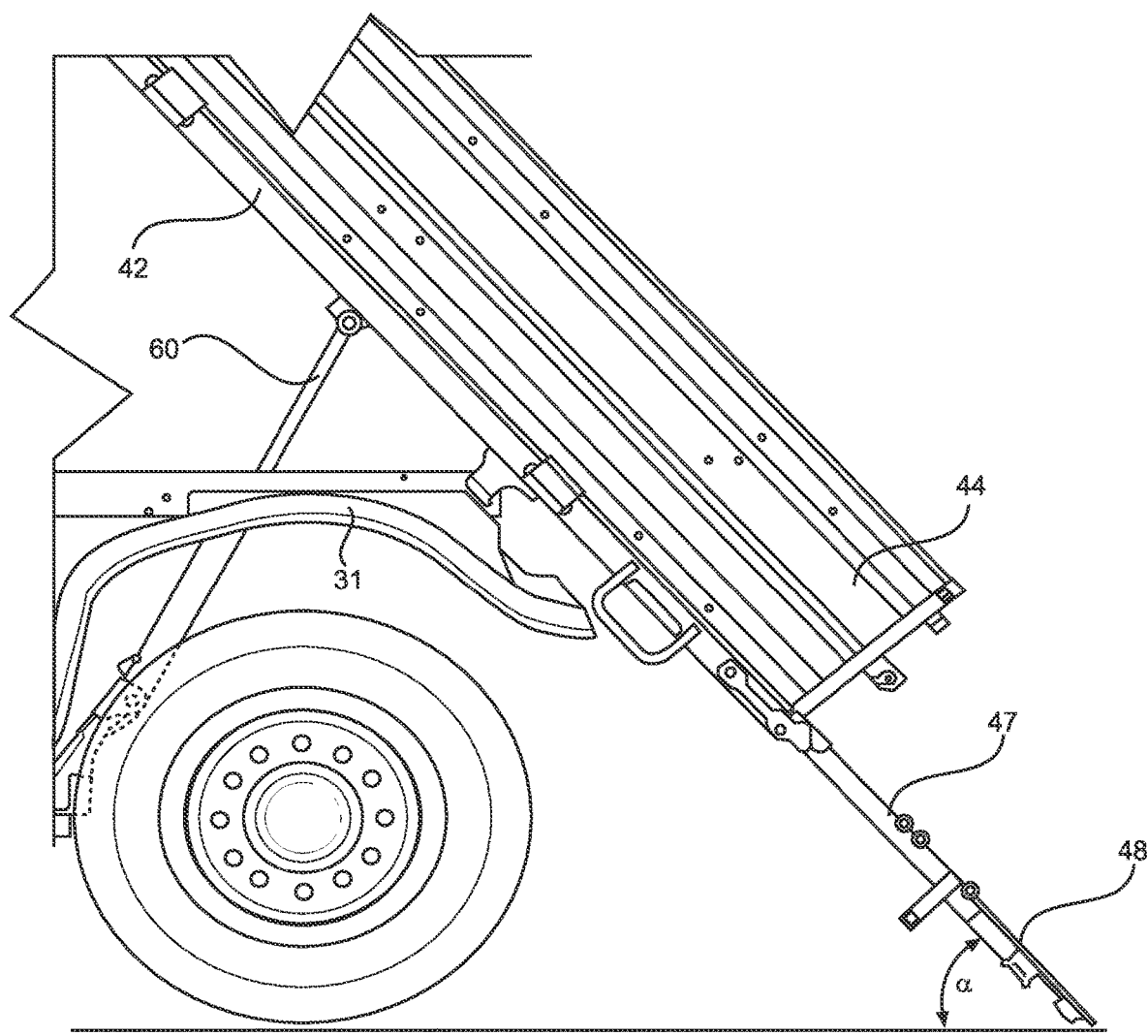
FIG. 11 shows the tailgate assembly in a fully extended ramp configuration.

FIG. 11, which is drawn to scale, illustrates geometrically exemplary angles and relative dimensions of the cargo bed 40 and tailgate assembly 46. In the example shown in FIG. 11, the first panel 47 and the second panel 48 are coplanar so that the angle between them is 180 degrees. Also, the plane defined by the first and second panels 47 and 48 in the configuration shown in FIG. 11 is coplanar with the bottom wall 42 of the cargo bed 40. In the example embodiment, the bottom wall 42 is rotated about 45 degrees with respect to a horizontal axis. Also, the first panel 47 is rotated about 90 degrees with respect to its cargo-containing position. The angle between the first and second panels 47 and 48 is 180 degrees. The angle α between the horizontal axis and the second panel 48 is about 45 degrees.

Figure 12:
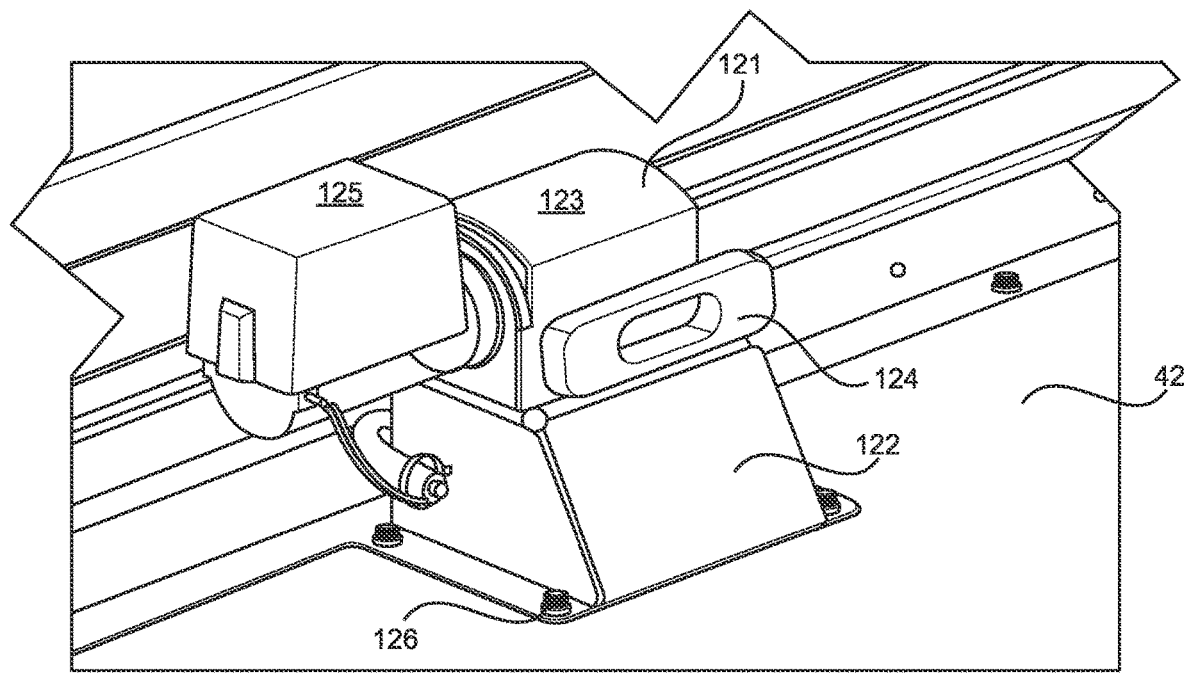
FIG. 12 shows a view of a winch assembly mounted to the bottom wall of the cargo bed in accordance with an aspect of the disclosure.
Figure 13:
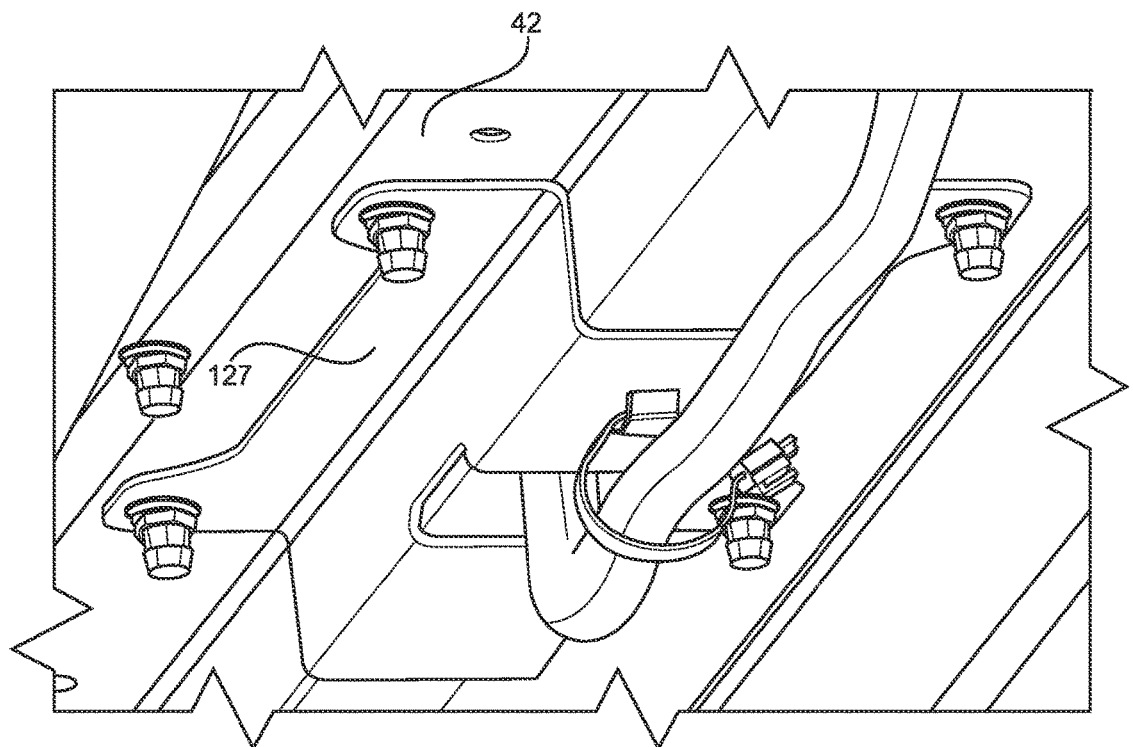
FIG. 13 shows a view of the underside of the cargo bed directly below the location of the winch assembly shown in FIG. 12.

FIG. 12 shows another embodiment of a bed-mounted winch assembly 120 in accordance with an aspect of this disclosure. The winch assembly 120 includes a motorized winch 121 and a mounting structure or mount 122 connected together and mounted to the bottom wall 42 of the cargo bed 40. The winch 121 has a housing 123 to house a spool (not shown) for winding and unwinding a flexible cable (not shown). The winch housing 123 includes a cable guide 124 through which the cable is configured to extend to guide the cable into and out of the housing 123. The winch 121 is connected to a motor 125 configured to drive rotation of the spool to wind and unwind the cable. The housing 123 is connected to the mounting structure or mount 122. The mount 122 has a base or flange 126 that is configured to be secured to the bottom wall 42 of the cargo bed with suitable fasteners, such as threaded fasteners or rivets, although the flange may alternatively be secured by welding. To reinforce the connection of the base 126 to the bottom wall 42 of the cargo bed 40 at the mounting location, a mounting plate 127 is fastened to the underside of the bottom wall 42 of the cargo bed 40 directly under the base 126, as shown in FIG. 13. Thus, the mount 122 securely connects the winch 121 to the cargo bed 40. Moreover, the mount 122 disposes the winch 121 within the cargo bed 40 so that an uppermost point of the winch assembly 120 is below the top edges of the side walls 43, 44, and 45 of the cargo bed 40. In other words, the winch assembly 120 does not protrude above the cargo bed 40. Such a low-profile design may facilitate use of an accessory cover (not shown) placed over the top edges of the side walls 43, 44, and 45 of the cargo bed 40. Such cover can be placed on the cargo bed 40 without interference from the winch assembly 120.

Figure 14:
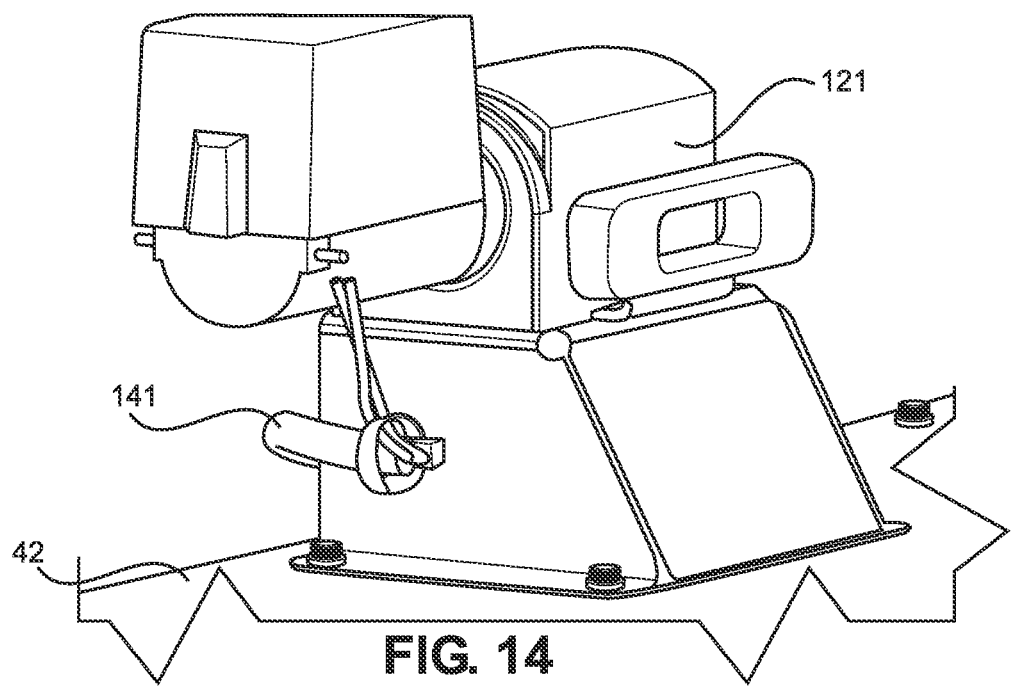
FIGS. 14-16 show wire routing between the winch assembly shown in FIG. 12 to the underside of the cargo bed shown in FIG. 13.
Figure 15:
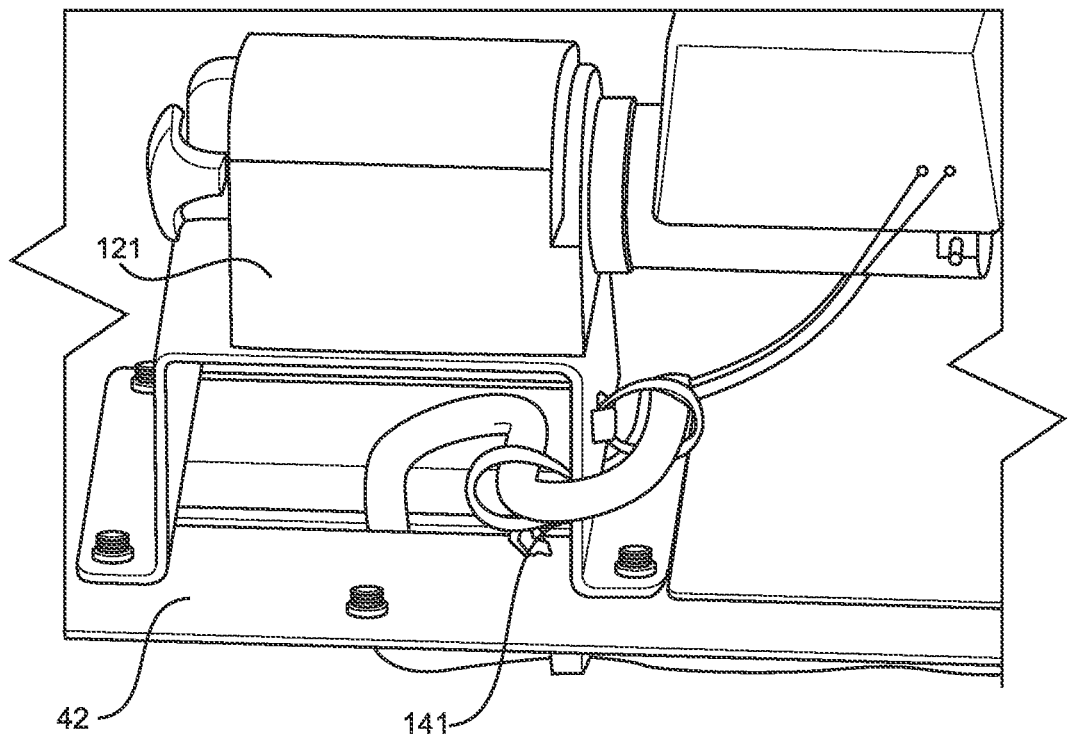
Figure 16:
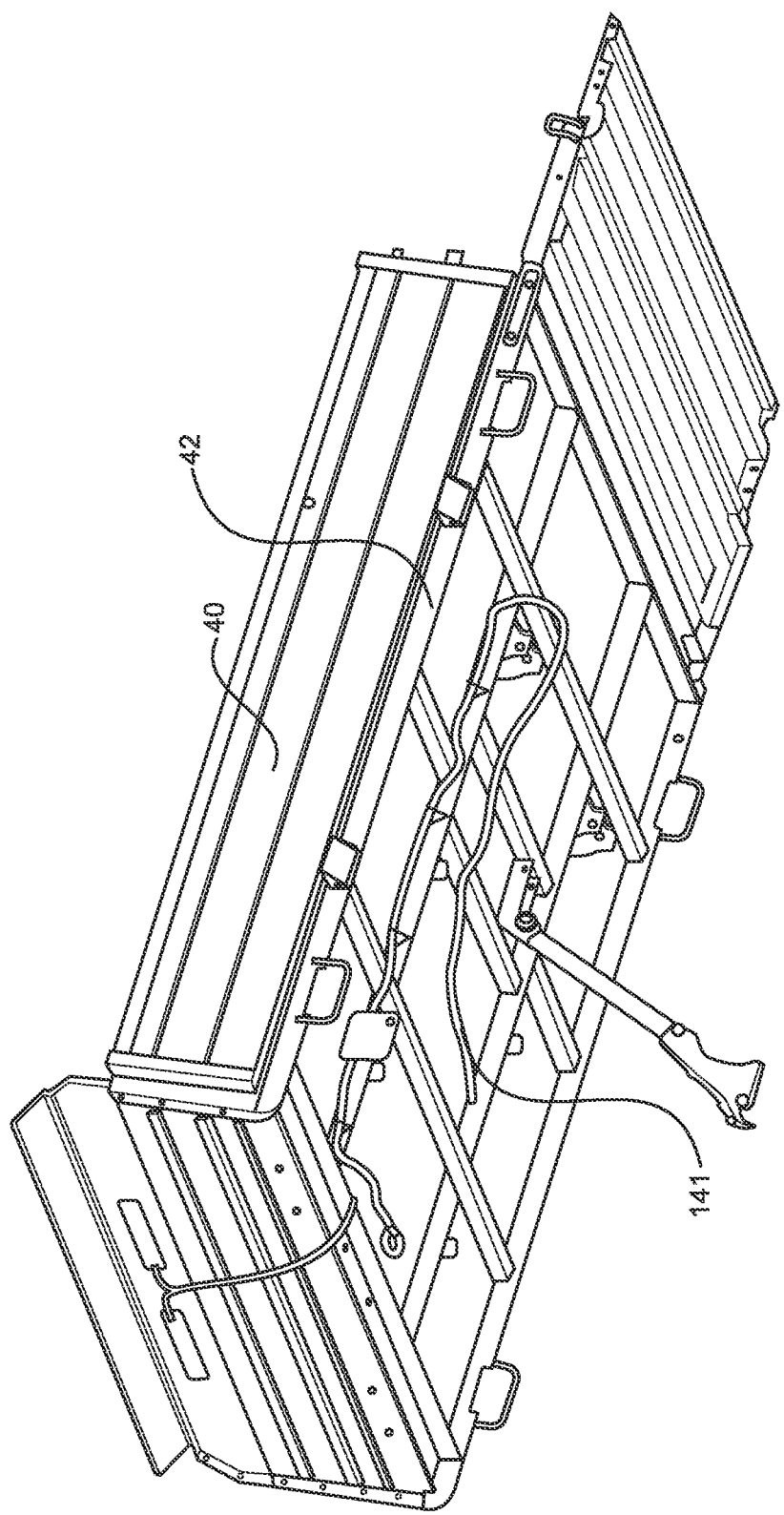

In order to be able to operate the winch 121 with the cargo bed 40 in the lowered and raised positions, electrical cabling (harness) 141 to the winch 121 is routed from the winch 121, through the bottom wall 42 of the cargo bed 40, and along the underside of the cargo bed 40, as shown in FIGS. 14-16. The cable routings permit use of the winch 121 throughout the entire range of angular displacement of the cargo bed 40. In embodiments, switches and controls to operate the winch 121 may be located in the cab 37 or on or around the cargo bed 40.

Above, a concrete description is given based on the embodiments according to aspects of the present disclosure. However, the present disclosure is not limited to the above-described embodiments and may be modified within a scope not deviating from the substance of the present disclosure.

Figure 17A:
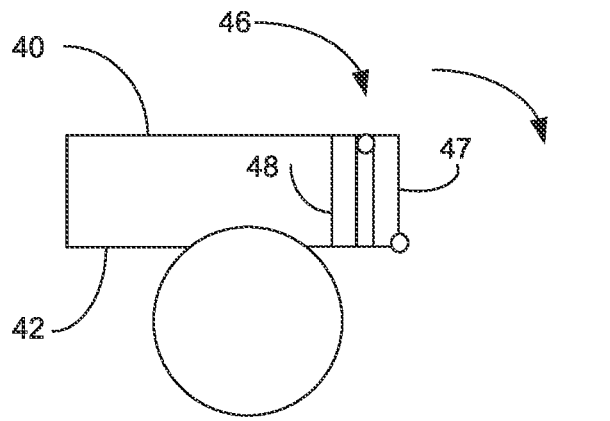
FIG. 17A is a schematic of an alternative embodiment of a cargo bed and tailgate assembly.
Figure 17B:
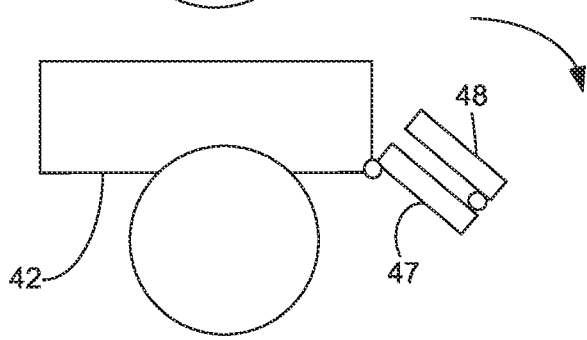
FIG. 17B shows the tailgate assembly of FIG. 17A with the first panel unfolded and the second panel folded.
Figure 17C:
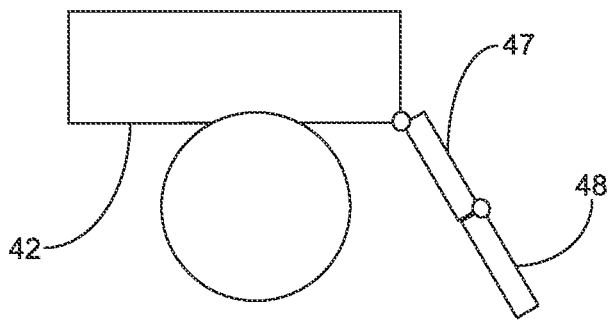
FIG. 17C shows the tailgate assembly of FIG. 17B with the first panel unfolded and the second panel unfolded in a ramp position.
Figure 17D:
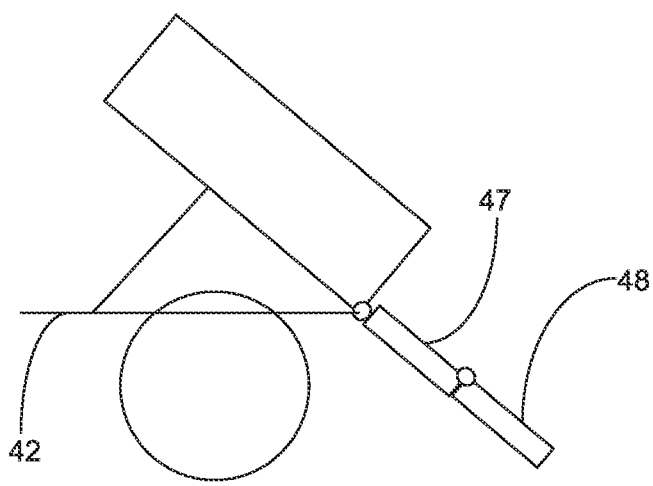
FIG. 17D shows the tailgate assembly of FIG. 17C with the cargo bed raised.

Within a scope not deviating from the substance of the present disclosure, appropriate modifications may be made to detailed structures and operations of each component configuring the tailgate. For example, in the above-described embodiment shown in FIGS. 5-8 the underside of the first and second panels face one another in the upright stowed configuration of the tailgate (FIG. 5A). However, the present disclosure is not limited to this. For example, modifications can be made to the tailgate assembly 46 shown in FIGS. 5 to 8 to permit the second panel 48 to fold into the cargo bed 40 in the upright configuration so that the upper surfaces of the first and second panels 47 and 48 face one another, as shown in FIG. 17A. This embodiment can permit a slightly different deployment operation than the tailgate shown in the embodiment shown in FIGS. 5 to 8. For example, upon release of the latches holding the first panel 47 in its cargo-retaining position (FIG. 17A), the first panel 47 will fold down (FIG. 17B) without any accompanied unfolding of the second panel 48 relative to the first panel 47. Then, with the first panel 47 unfolded folded as shown in FIG. 17B, a user can unfold the second panel 48 away from the first panel 47, as shown in FIG. 17C.

Also, in the above-described embodiment shown in FIG. 10, a cable or brace 102 is used to limit the range of angular displacement the first panel 47 about its horizontal axis. However, the present disclosure is not limited to this. For example, a gas strut 180 may be used in place of the cable 102 to control the range and speed of angular displacement. In addition, a gas strut that is biased in a retracted position may be useful to control the rate of motion of falling tailgate panels 47 and 48 to prevent stress on the brackets 65 from the momentum of the tailgate panels as they unfold and/or hit the ground or other objects. Another benefit of the gas strut 180 is to assist the user in lifting the tailgate assembly back into its fully folded and stowed configuration shown in FIG. 5A.

In another embodiment, there may also be a gas strut 182 connected between the first and second panels 47 and 48. The gas strut 182 may be biased towards an extended position so that upon release of the latches 67, the strut 182 will extend to assist in rotating the second panel 48 relative to the first panel 47 as the first panel 47 swings down. Moreover, such gas strut 182 connected between the first and second panels 47 and 48 can be used to assist the user in positioning the second panel 48 without the user having to bear the full weight of the second panel themselves upon release of the latches 67.

In another embodiment, one or both of the aforementioned gas struts 180 and 182 can be substituted with linear actuators that can be independently controlled to adjust the angle of the first panel 47 relative to the bottom wall 42 of the cargo bed 40 and the angle between the first and second panels 47 and 48.

Also, in the above-described embodiment shown in FIG. 10, a stop bar 100 is used to limit the range of angular displacement of the second panel 48 relative to the first panel 47. However, the present disclosure is not limited to this. For example, in another embodiment, a stop bar release mechanism may be provided to remove or disable the stop bar 100 to thereby permit the second panel 48 to freely rotate relative to the first panel 47. Also, it will be appreciated that instead of the stop bar 100 being connected to the side flanges 48c of the second panel 48, a similar stop bar may be connected to the side flanges of the first panel 47c.

Also, in the above-described embodiment shown in FIGS. 8 and 9, three discrete hinges 85, 86, and 87 are employed to hingedly connect the first panel 47 to the second panel 48. However, the present disclosure is not limited to this. For example, in other embodiments, a continuous piano hinge of suitable rigidity may be used extending along the joint between the first and second panels 47 and 48.

Also, in the above-described embodiments shown in FIGS. 5A-5D, the panels 47 and 48 are hingedly connected. However, the present disclosure is not limited to this. For example, in other embodiments, the panels 47 and 48 may be telescopically connected such that panel 48 can extend and retract telescopically with respect to panel 47. Such a telescopic connection may take the form of one or more sliding tracks or rails connecting the panels 47 and 48 together permitting panel 48 to slide relative to panel 47 between an extended position (ramp configuration) and a retracted position (stowed configuration).

Also, in the above-described embodiments shown in FIGS. 12 and 13, the mount 122 is secured to the bottom wall 42 of the cargo bed 40. However, the present disclosure is not limited to this. For example, the mount 122 may in other embodiments alternatively be secured to both the bottom wall 42 and the front side wall 43 of the cargo bed 40, or to only the front side wall 43 of the cargo bed 40.

It is noted that the foregoing examples have been provided merely for the purpose of explanation and are in no way to be construed as limiting of the present disclosure. While the present disclosure has been described with reference to exemplary embodiments, it is understood that the words which have been used herein are words of description and illustration, rather than words of limitation. Changes may be made, within the purview of the appended claims, as presently stated and as amended, without departing from the scope and spirit of the present disclosure in its aspects. Although the present disclosure has been described herein with reference to particular structures, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A tailgate assembly for a tiltable cargo bed extending from a forward end to a rearward end, wherein the tiltable cargo bed is pivotally connected to a frame supporting the tiltable cargo bed, and the tiltable cargo bed is configured to rotate relative to the frame between a lowered position and a raised position, the tiltable cargo bed having a left side wall extending at least partially from the forward end to the rearward end, a right side wall extending at least partially from the forward end to the rearward end, and a bottom wall extending at least partially from the forward end to the rearward end, and further extending at least partially between the left side wall and the right side wall and defining an opening at the rearward end between the left and right side walls and the bottom wall, the tailgate assembly comprising:

a first panel pivotally connectable to the bottom wall, the first panel pivotable between a cargo-retaining position and an unfolded position with respect to the bottom wall, wherein in the cargo-retaining position, the first panel closes the opening at the rearward end of the cargo bed; and a second panel pivotally connected to the first panel, wherein the second panel is pivotable between a folded position and a ramp position, wherein in the folded position the first panel and the second panel are substantially parallel to one another and in the ramp position the first and second panels extend from one another at an angle greater than ninety degrees, wherein the first panel includes a reinforcement channel and the second panel includes notches that receive the reinforcement channel, wherein the second panel nests into the first panel when the first panel is in the cargo-retaining position and the second panel is in the folded position such that the reinforcement channel of the first panel is received within the notches of the second panel, and wherein the reinforcement channel and the notches are arranged on lower-facing surfaces of the first panel and the second panel, respectively, when the first panel is in the unfolded position and the second panel is in the ramp position.

2. The tailgate assembly according to claim 1, wherein:
the first panel extends from a first end to a second end,
the second panel extends from a first end to a second end, and
the second end of the first panel is hingedly attached to the first end of the second panel such that the second panel is movable between the folded position and the ramp position.

3. The tailgate assembly according to claim 2, wherein:
the first panel and the second panel are hingedly attached with a plurality of hinges spaced along lengths of the first and second panels.

4. The tailgate assembly according to claim 1, wherein:
the first panel defines an end wall for the tiltable cargo bed when the first panel is in the cargo-retaining position.

5. The tailgate assembly according to claim 1, further comprising:
a locking member configured to selectively retain the first panel in the cargo-retaining position.

6. The tailgate assembly according to claim 1, further comprising:
a limiting member coupled to the first panel or the second panel configured to limit an angular displacement of the second panel between the folded position and the ramp position to a predefined maximum angle.

7. The tailgate assembly according to claim 6, wherein:
the maximum angle is 180 degrees.

8. The tailgate assembly according to claim 1, further comprising:
a limiting member coupled to the first panel and configured to limit an angular displacement of the first panel between the cargo-retaining position and the unfolded position to a predefined maximum angle.

9. The tailgate assembly according to claim 8, wherein:
the maximum angle is 90 degrees.

10. The tailgate assembly according to claim 1, wherein:
the first panel has an upper flat side and a lower corrugated side and the second panel has an upper flat side and a lower corrugated side, and wherein the flat sides of the first and second panels face in opposite directions when the first panel is in the cargo retaining position and the second panel is in the folded position and wherein the upper flat sides of the first and second panels face upwardly when the first panel is in the unfolded position and the second panel is in the ramp position.

11. The tailgate assembly according to claim 1, wherein:
the left side wall and the right side wall have a side wall height,
a height of the first panel and a height of the second panel are each approximately the same as the side wall height, and
with the first panel in the unfolded position and the second panel in the ramp position, the first panel and the second panel together form a ramp.

12. The tailgate assembly according to claim 1, wherein a width of the second panel in a vehicle cross-wise direction is less than a width of the first panel in the vehicle cross-wise direction.

13. A vehicle comprising a tiltable cargo bed extending from a forward end to a rearward end, the tiltable cargo bed comprising:
a front side wall at the forward end;
a left side wall extending at least partially from the front side wall to the rearward end;
a right side wall extending at least partially from the front side wall to the rearward end; and
a bottom wall extending at least partially from the front side wall to the rearward end, and further extending at least partially between the left side wall and the right side wall and defining an opening at the rearward end between the left and right side walls and the bottom wall; and
a tailgate assembly comprising:
a first panel pivotally connected to the bottom wall, the first panel pivotable between a cargo-retaining position and an unfolded position with respect to the bottom wall, wherein in the cargo-retaining position, the first panel closes the opening at the rearward end of the tiltable cargo bed; and
a second panel pivotally connected to the first panel, wherein the second panel is pivotable between a folded position and a ramp position, wherein in the folded position the first panel and the second panel are substantially parallel to one another and in the ramp position the first and second panels extend from one another at an angle greater than ninety degrees,
wherein the vehicle includes a frame supporting the tiltable cargo bed,
wherein the tiltable cargo bed is pivotally connected to the frame and the tiltable cargo bed is configured to rotate relative to the frame between a lowered position and a raised position,
wherein the first panel includes a reinforcement channel and the second panel includes notches that receive the reinforcement channel,
wherein the second panel nests into the first panel when the first panel is in the cargo-retaining position and the second panel is in the folded position such that the reinforcement channel of the first panel is received within the notches of the second panel, and
wherein the reinforcement channel and the notches are arranged on lower-facing surfaces of the first panel and the second panel, respectively, when the first panel is in the unfolded position and the second panel is in the ramp position.

14. The vehicle according to claim 13, further comprising a winch assembly for the tiltable cargo bed, the winch assembly comprising:
a winch including a motor and a housing for a spool configured to be driven by the motor, the spool configured to wind and unwind cable;
a mount extending from and supporting the winch, the mount having a base configured for fixed connection to at least one of the bottom wall of the tiltable cargo bed and the front side wall of the tiltable cargo bed.

15. The vehicle according to claim 14, further comprising:
a wiring harness connected to the winch and extending through a hole defined in the bottom wall of the tiltable cargo bed and extending along an underside of the bottom wall of the tiltable cargo bed.

16. The vehicle according to claim 14, wherein:

a height of the winch measured in a direction perpendicular to an upper surface of the bottom wall of the tiltable cargo bed is less than a height of any of the front side wall, left side wall, and right side wall of the tiltable cargo bed.

17. The vehicle according to claim 13, further comprising:

a winch assembly fixed to the tiltable cargo bed, the winch assembly including:
- a winch having a motor and a housing for a spool configured to be driven by the motor to rotate the spool to wind and unwind a cable from the spool;
- a mount extending from the winch and having a base fixed to at least one of the bottom wall of the tiltable cargo bed and the front side wall of the tiltable cargo bed.

18. The vehicle according to claim 13, wherein:

the first panel extends from a first end to a second end, the second panel extends from a first end to a second end, and the second end of the first panel is hingedly attached to the first end of the second panel such that the second panel is movable between the folded position and the ramp position.

19. The vehicle according to claim 13, wherein:

when the tiltable cargo bed is in the raised position and the first panel is in the unfolded position and the second panel is in the ramp position, upper surfaces of the bottom wall of the tiltable cargo bed, the first panel, and second panel are coplanar to one another.

20. The vehicle according to claim 13, wherein a width of the second panel in a vehicle cross-wise direction is less than a width of the first panel in the vehicle cross-wise direction.

* * * * *